March 16, 1943. R. LINDER Re. 22,288

GIRDLE GARTER

Original Filed March 21, 1939

INVENTOR
Rosanne Linder
BY
Herbert S. Fairbanks
ATTORNEY

Reissued Mar. 16, 1943

Re. 22,288

UNITED STATES PATENT OFFICE 22,288

GIRDLE GARTER

Rosanne Linder, Upper Darby, Pa.

Original No. 2,223,216, dated November 26, 1940, Serial No. 263,102, March 21, 1939. Application for reissue September 18, 1942, Serial No. 459,067

5 Claims. (Cl. 2—313)

The object of my invention is to devise a novel girdle garter which will provide full freedom of movement of the body in any position it may assume, such as in bending, kneeling and the like, and will have a yielding action in holding the girdle down and in holding the stockings up.

A further object is to devise a novel garter which will eliminate the strain and tension which was heretofore present when a girdle was attached to the stockings, so that runs caused by the streching of a stocking over the knee will be eliminated.

A further object of the invention is to devise a longitudinally adjustable girdle, preferably shaped to conform to the portion of the thigh with which it cooperates, and of elastic or non-elastic material, but having elastic or yielding members to which the girdle is detachably connected.

A further object is to devise a novel garter which can be connected with the girdle without being connected with the stockings.

With the above and other objects in view as will hereinafter clearly appear, my invention comprehends a novel girdle garter.

It further comprehends a novel girdle garter comprising a longitudinally adjustable garter, preferably shaped to conform to the thigh of the user, having elastic portions disposed in a novel manner to receive the clasps on the tabs depending from the girdle, and having also if desired, elastic or non-elastic tabs having clasps to engage the stockings.

Other novel features of construction and advantage will hereinafter appear in the detailed description and the appended claims.

For the purpose of illustrating the invention, I have shown in the accompanying drawing typical embodiments of it, which in practice, will give satisfactory and reliable results. It is, however, to be understood that the various instrumentalities of which my invention consists can be variously arranged and organized and my invention is not limited to the exact arrangement and organization of these instrumentalities as herein set forth.

Similar numerals indicate corresponding parts.

Figure 1:
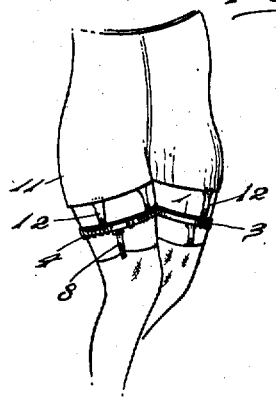
Figure 1 is a perspective view showing my novel garter in position on the thighs of the wearer.
Figure 2:
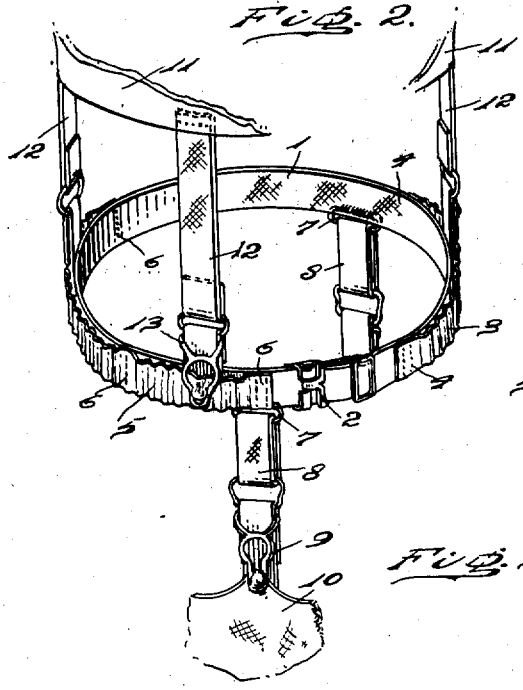
Figure 2 is a perspective view, on an enlarged scale, of the garter shown in Figure 1.

Referring to the drawing:

Referring first to Figures 1 and 2, the garter comprises an elastic band 1, having a conventional fastener or clasp 2 for its free ends and which provides in the usual manner for the adjustment of the length of the band. The band has secured to its front side an elastic strip 3, secured at its free ends to the band by stitching 4. The band has at its rear side an elastic strip 5 which extends around the back portion of the band and one side and is secured at its free ends and intermediate its free ends to the band by stitching 6. The band 1 has loops 7 at opposite sides, which may be metallic or non-metallic, elastic or non-elastic, and, to these loops, longitudinally adjustable tabs 8 are connected and provided with clasps 9 of any desired construction to connect with a stocking 10. The loops 7 are preferably stitched to the band 1. 11 designates a girdle or body garment having two or more tabs 12, longitudinally adjustable in the conventional manner and having clasps 13 to engage an elastic strip 3 or 5. Usually a front and a back tab 12 are employed and sometimes also a side tab 12, and for this reason the elastic strip 5 is extended around a side of the band to receive a clasp 13.

Figure 3:
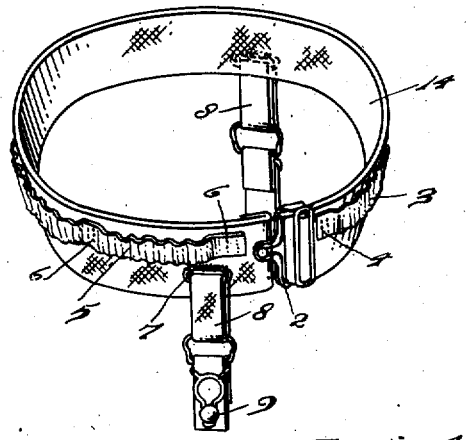
Figure 3 is a perspective view of another embodiment of my invention.
Figure 4:
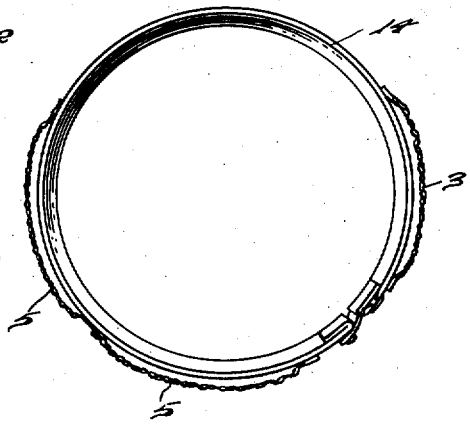
Figure 4 is a top plan view of Figure 3.
Figure 5:
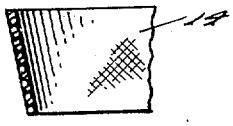
Figure 5 is a sectional view on an enlarged scale, of a portion of Figure 3 to show the manner in which it conforms to the thigh of the wearer.

In the embodiment seen in Figures 3, 4 and 5, the parts are the same except that the band 14 is substantially non-elastic and is cut or shaped to conform to the shape of the thigh by having it longer at the top than at the bottom to give a tapered or conical inner wall to contact the thigh as will be clearly understood by reference to Figures 3, 4 and 5.

The manner in which the girdle garter is used will be clearly apparent from Figure 1.

The band is adjusted to the proper length and secured around the thigh. The clasps on the tabs connected with the girdle are fastened to the elastic strips connected with the band. These elastic strips provide for free freedom of movement of the body in bending, kneeling and the like without an uncomfortable pull on the girdle or upward pull on the band.

The girdle garter can be used with the girdle alone, for example when short hose, or evening gowns are worn.

When the clasps 9 are attached to the stockings at the side, the elastic strips and the tabs connected with the girdle and the tabs connected with the stockings permits stretching of the stocking without undue strain, especially when the knees are bent, thus contributing to reducing runs in stockings by preventing a strong pull or direct strain on the yarn of the stocking as occurs when the girdle is directly connected with the stocking.

When the tabs 8 and 9 are not to be connected with the stockings, they may be removed.

Having thus described my invention, what I claim as new and desire to secure by Letters Patent is:

1. A device for holding down a body garment, comprising a non-elastic band of greater diameter at its top than at its bottom and having its inner face smooth and unobstructed and converging downwardly to conform to the contour of the thigh above the top of the stocking and to thereby have its upward movement on the thigh limited, and elastic strips extending circumferentially of the band and each secured at spaced points to the outer face of the band and being free thereof intermediate said points, and adapted to receive tabs depending from a body garment.

2. A device for holding down a body garment, comprising a non-elastic band of greater diameter at its top than at its bottom and having its inner face smooth and unobstructed and converging downwardly to conform to the contour of the thigh above the top of the stocking and to thereby have its upward movement on the thigh limited, elastic strips extending circumferentially of the band and each secured at spaced points to the outer face of the band and being free thereof intermediate said points, and adapted to receive tabs depending from a body garment, and stocking supporting tabs depending from said band at opposite sides and one of which is disposed at the inside of the leg intermediate the strips.

3. A device for holding down a body garment, comprising a non-elastic band of greater diameter at its top than at its bottom and having its inner face smooth and unobstructed and converging downwardly to conform to the contour of the thigh above the top of the stocking and to thereby have its upward movement on the thigh limited, and strips extending circumferentially of the band and each secured at spaced points to the outer face of the band and being free thereof intermediate said points and adapted to receive tabs depending from a body garment.

4. A girdle garter, comprising a band of greater diameter at its top portion and of smaller diameter below the top portion and substantially non-expansible at its smaller diameter when in holding position on the thigh of the wearer with the top portion of the band connected with a girdle, the portion of smaller diameter gripping the thigh and preventing upward movement of the band on the thigh and thereby preventing upward movement of the girdle on the body of the wearer, and the gripping action of the band on the thigh being released when the upward pull of the girdle on the band is released, and means to connect the band to the girdle, the connecting means permitting bodily downward movement of the band relatively to the girdle when the gripping action is released.

5. A girdle garter, comprising a band of greater diameter at its top portion and of smaller diameter at its bottom portion and substantially non-expansible at its bottom portion when in holding position on the thigh of the wearer with its top portion connected with a girdle, the portion of the band of smaller diameter gripping the thigh and preventing upward movement of the band on the thigh and thereby upward movement of the girdle on the body of the wearer, and the gripping action of the band on the thigh being released when the upward pull of the girdle on the band is released, and means to connect the band with the girdle, the connecting means permitting bodily downward movement of the band relatively to the girdle when the gripping action is released.

ROSANNE LINDER.